United States Patent Office 3,533,923
Patented Oct. 13, 1970

3,533,923
GOLD AND GOLD ALLOY PLATING SOLUTIONS
Thomas R. Moore, Jr., Providence, R.I., and Florence P. Butler, Middlebury, Vt., assignors to Technic, Inc., Cranston, R.I.
No Drawing. Original application Jan. 12, 1966, Ser. No. 520,073, now Patent No. 3,458,542, dated July 29, 1969. Divided and this application May 27, 1969, Ser. No. 852,519
Int. Cl. C23b 5/28, 5/42; C23c 3/00
U.S. Cl. 204—44          10 Claims

ABSTRACT OF THE DISCLOSURE

Novel metal compounds carrying a metal element from group I–B, II–B, III–A, IV–A, or VIII of the periodic system together with gold in a combination complex form wherein the element other than gold is complexed with amine and gold in an aurous cyanide form provide gold and the accompanying metal in a precise ratio useful for the plating of gold alloys and the aqueous gold and gold alloy plating solutions containing such metal compounds.

RELATED APPLICATIONS

This is a division of application Ser. No. 520,073 filed Jan. 12, 1966, issued July 29, 1969 as U.S. Pat. No. 3,458,542.

The present invention is directed to novel compositions of matter, processes for preparing such compositions of matter, and the use of such compositions of matter.

It is an object of the present invention to provide novel compounds.

It is also an object of the present invention to provide processes for preparing said novel compounds.

It is another object of this invention to provide aqueous solutions containing said novel compounds which are useful as metal plating solutions.

The invention also contemplates providing processes for plating metals from solutions containing said novel compounds.

Other objects and advantages of the invention will in part be obvious and will in part become apparent from the following specification.

In its broadest aspects, the invention provides novel compounds having the formula $M(E)_m(Au(CN)_2)_n$, wherein M represents a metallic element selected from Group I–B, II–B, III–A, IV–A, or VIII of the Periodic Table; $n$ is a numeral equal to the most common positive valence of the metal M in aqueous solution; $m$ is an integer from $n-1$ to $n+1$; and E is an amine of the formulae

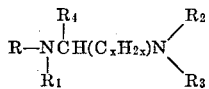

or

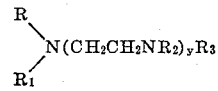

wherein $x$ is 1–3, $y$ is 1–4, R, $R_1$, $R_2$, and $R_3$ are each selected from hydrogen, hydroxymethyl and hydroxyethyl, $R_4$ is hydrogen or a straight chain alkyl of 1–4 carbon atoms, and at least two of said groups identified as R, $R_1$, $R_2$, $R_3$ and $R_4$ are hydrogen. The preferred compounds are those in which the amine is ethylenediamine, isopropylenediamine, tetraethylenepentamine, and aminoethyl ethanolamine.

The compounds of this invention are prepared by adding in water a cation of the Group I–B, II–B, III–A, IV–A, or VIII metal; the amine reactant; and the gold cyanide complex supplied by dissolution of potassium gold dicyanide, $KAu(CN)_2$, or sodium gold dicyanide, $NaAu(CN)_2$. The metal cations are formed in the water by dissolution of a salt of the metal which disassociates in water. The temperature of the reaction mixture is not critical, although it is preferred that it be between ambient temperatures, e.g., about 20° C.–30° C., and about 95° C.

The preferred procedure comprises dissolving the salt of the metal in water, adding the amine, and then adding an aqueous solution of the dicyanide. Stoichiometric amounts of the reactants may be employed. It is preferred to use an excess of the amine reactant. The novel compounds of this invention may be isolated by cooling the aqueous solution when the reaction is carried out at relatively high temperatures, or may be isolated by concentrating it to cause precipitation of the salts, which may be collected by filtration.

The compounds of the invention are stable, non-hydroscopic solids. They are complex salts.

The metal "M" of the formula is supplied by dissolving water soluble salts, such as the chlorides, nitrates, sulfates, acetates, oxalates, phosphates, borates, etc., of the desired Group I–B, II–B, III–A, IV–A, or VIII metal. The inorganic salts of the metals are preferred. The following list of salts are illustrative of those that may be used: cupric chloride, zinc chloride, cadmium chloride, nickel chloride, silver nitrate, chloroauric acid ($HAuCl_4$), palladium ethylenediamine sulfate $$(Pd(NH_2CH_2CH_2NH_2)_2SO_4)$$

indium sulfate, and platinum diamino nitrate.

The following examples further illustrate the preparation of the novel compounds and their properties to those skilled in the art.

EXAMPLE 1

To an aqueous solution containing 0.02 mole of cupric chloride, ethylenediamine was added in a molar ratio of 2:1. A second aqueous solution containing potassium gold dicyanide equal to two times the number of moles of cupric chloride was added. Total volume was one liter. The blue crystals which formed on standing were removed by filtration.

Analysis.— Calc'd for $C_8H_{16}N_6Au_2Cu$ (percent): C, 14.2; H, 2.4; N, 16.6; Au, 58.3; Cu, 9.4. Found (percent): C, 13.8; H, 2.3; N, 16.5; Au, 57.8; Cu, 10.1.

EXAMPLE 2

A solution containing 0.02 mole of zinc chloride in degassed water was heated to 75° C. Ethylenediamine was added until the initial cloudy precipitate disappeared, leaving a colorless solution. A solution containing potassium gold dicyanide equal to two times the molar amount of zinc chloride used, also dissolved in degassed water at 75° C., was added. Total volume was one liter. The white needles which formed on cooling were removed by filtration.

Analysis.—Cal'd for $C_{10}H_{24}N_{10}Au_2Zn$ (percent): C, 16.1; H, 3.3; N, 18.8; Au, 53.0; Zn, 8.8. Found (percent): C, 16.3; H, 3.6; N, 19.0; Au, 52.5; Zn, 9.2.

EXAMPLE 3

An aqueous solution containing 0.02 mole of cadmium chloride, $CdCl_2 \cdot 2\frac{1}{2}H_2O$, was heated to 95° C. and ethylenediamine was added at a ratio of two moles of ethylenediamine to one of cadmium chloride. An aqueous solution of potassium gold dicyanide at 95° was added. The ratio of gold compound to cadmium chloride was two moles to one. Total volume was one liter. The mixture was cooled to room temperature and the pale yellow needles were separated by filtration.

*Analysis.*—Calc'd for $C_8H_{10}N_8Au_2Cd$ (percent): C, 13.0; H, 2.2; N, 15.1; Au, 53.4; Cd, 15.2. Found (percent): C, 12.6; H, 2.1; N, 14.5; Au, 53.0.

EXAMPLE 4

$Ni(NH_2CH_2CH_2NH_2)_2(Au(CN)_2)_2$

To an aqueous solution containing 0.076 mole of nickel chloride at 75° C., ethylenediamine was added until the initial white precipitate redissolved. Potassium gold dicyanide equal to two times the number of moles of nickel chloride, dissolved in water at 75° C., was added. Total volume was one gallon. The mixture was cooled to room temperature and the blue precipitate was removed by filtration.

*Analysis.*—Calc'd for $C_8H_{10}N_8Au_2Ni$ (percent): C, 14.2; H, 2.4; N, 16.5; Au, 58.3; Ni, 8.7. Found (percent): C, 14.2; H, 2.5; N, 16.5; Au, 57.0; Ni, 8.1.

EXAMPLE 5

$Ag(NH_2CH_2CH_2NH_2)(Au(CN)_2)$

To an aqueous solution containing 0.02 mole of silver nitrate at 75° C., ethylenediamine was added until the initial white precipitate redissolved. Potassium gold dicyanide equal to two times the number of moles of silver nitrate dissolved in water at 75° C., was added. Total volume was one liter. The mixture was cooled to room temperature and the white precipitate was removed by filtration.

*Analysis.*—Calc'd for $C_4H_5N_4AgAu$ (percent): C, 11.5; H, 1.9; N, 13.4; Ag, 25.8; Au, 47.3. Found (percent): C, 11.6; H, 2.4; N, 13.3; Ag, 25.0; Au, 47.3.

EXAMPLE 6

$Au(NH_2CH_2CH_2NH_2)(Au(CN)_2)$

To an aqueous solution containing 0.04 mole of chloroauric acid, $HAuCl_4$, ethylenediamine was added until the initial orange precipitate redissolved to give a clear, red solution. Potassium gold dicyanide equal to the number of moles of chloroauric acid, in aqueous solution, was added. Total volume was one liter. The yellow precipitate which formed was removed by filtration.

*Analysis.*—Calc'd for $C_4H_5N_4Au_2$ (percent): C, 9.5; H, 1.6; N, 11.1; Au, 77.8. Found (percent): C, 9.5; H, 1.7; N, 10.8; Au, 78.0.

EXAMPLE 7

$Pd(NH_2CH_2CH_2NH_2)_2(Au(CN)_2)_2$

To an aqueous solution containing 0.02 mole of palladium ethylenediamine sulfate, $Pd(NH_2CH_2CH_2NH_2)_2SO_4$ an aqueous solution of potassium gold dicyanide was added. The molar ratio of palladium salt to gold salt was 1:2. Total volume was one liter. The yellow needles which formed were removed by filtration.

*Analysis.*—Calc'd for $C_8H_{10}N_8Au_2Pd$ (percent): C, 13.3; H, 2.2; N, 15.5; Au, 54.4; Pd, 14.7. Found (percent): C, 13.2; H, 2.3; N, 15.3; Au, 54.4; Pd, 13.4.

EXAMPLE 8

$Cu(NH_2CH_2CH(NH_2)CH_3)_2(Au(CN)_2)_2$

To an aqueous 70° C. solution containing 0.01 mole of cupric chloride, isopropylenediamine was added in a molar ratio of 2:1. A second aqueous 70° C. solution containing potassium gold dicyanide equal to two times the number of moles of cupric chloride was added. Total volume was 200 mls. The blue crystals which separated on cooling were removed by filtration.

*Analysis.*—Calc'd for $C_{10}H_{20}N_8Au_2Cu$ (percent): C, 16.9; H, 2.8; N, 15.8; Au, 55.6; Cu, 9.0. Found (percent): C, 17.6; H, 2.8; N, 15.8; Au, 54.2; Cu, 8.6.

EXAMPLE 9

$Cu(NH_2(CH_2CH_2NH)_4H)(Au(CN)_2)_2$

To an aqueous 70° C. solution containing 0.01 mole of cupric chloride, tetraethylenepentamine was added in a molar ratio of 2:1. A second aqueous 70° C. solution containing potassium gold dicyanide equal to two times the number of moles of cupric chloride was added. Total volume was 200 mls. The blue crystals which formed on standing were removed by filtration.

*Analysis.*—Calc'd for $C_{12}H_{23}N_9Au_2Cu$ (percent): C, 19.2; H, 3.1; N, 16.8; Au, 52.5; Cu, 8.5. Found (percent): C, 20.3; H, 3.3; N, 16.9; Au, 52.5; Cu, 9.0.

EXAMPLE 10

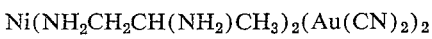
$Ni(NH_2CH_2CH(NH_2)CH_3)_2(Au(CN)_2)_2$

To an aqueous 70° C. solution containing 0.01 mole of nickelous chloride, isopropylenediamine was added in a molar ratio of 2:1. A second aqueous 70° C. solution containing potassium gold dicyanide equal to two times the number of moles of nickelous chloride was added. Total volume was 200 mls. The lilac-colored crystals which formed on coooling were removed by filtration.

*Analysis.*—Calc'd for $C_{10}H_{20}N_8Au_2Ni$ (percent): C, 17.2; H, 2.9; N, 15.9; Au, 55.8; Ni, 8.3. Found (percent): C, 17.3; H, 2.7; N, 15.8; Au, 56.4; Ni, 8.6

Compounds corresponding to those exemplified were prepared using the corresponding salts of platinum, indium, and cobalt. Similarly, other amines of the class specified are used in place of those exemplified to obtain the corresponding compounds.

The novel compounds of this invention are useful as a source of gold and often also of an alloying metal, in aqueous plating baths from which gold, or gold alloys are deposited. Baths employed for the deposition of gold alloys normally contain gold as the sodium, or potassium dicyanide, and the other metal as a water-soluble salt. Since the gold and the other metal are added to the bath separately and plated at independent rates, difficulties are encountered in maintaining the optimum concentration of the two metals. When utilizing the complex salts of this invention, the gold and the other metal are obtained in a fixed ratio. If pure gold plate is desired, the complex salt in which M is also gold is used. The plating baths may be electroplating baths, or may be baths used for immersion (chemical) plating. The baths are aqueous baths containing the novel gold salts of this invention, together with other compounds and/or other types of additives, commonly used in plating, such as wetting agents, brighteners, conducting salts, pH adjusters, etc. The baths may be prepared by dissolving the desired amount of the complex salt of this invention in water, and adding the other bath additives. The baths may also be made up by using the aqueous reaction mixtures in which the complex salts are made, and adjusting the water content to result in the concentration of salt desired for plating, and adding the other plating additives.

Preferred aqueous electroplating baths are those containing between about 5 dwt./gal. (dwt. is an abbreviation of dinar-weight and is equal to 1.555 grams) and 30 dwt./gal. of metallic gold, the gold being in the form of the compounds of this invention; between about 200 and 600 grams per gallon of dipotassium phosphate; and sufficient ammonium hydroxide to adjust the pH from between about 8.0 to about 12.0. The bath may also contain up to about 200 milliliters per gallon of ethylenediamine. Where relatively larger amounts of ethylenediamine are used, the quantity of dipotassium phosphate is used in the lower portion of the range specified.

The immersion chemical plating bath is preferably a bath containing between about 5 and 20 dwt./gal. (calculated as metallic gold) of the complex salts of this invention, between about 10 and 60 grams per gallon of dipotassium phosphate, between about 50 and 200 grams per gallon of a complexing agent such as the disodium salt of ethylenediamine tetraacetic acid, aminopolycarboxylic acid groups, such as nitrilotriacetic acid, ethylenediamine tetraacetic acid, hydroxyethyl-ethylenediamine triacetic acid, ethylenediamine diacetic acid, cyclohexanediamine tetraacetic acid, diethylene triamine pentaacetic acid, imino diacetate, etc., and a minor amount of a conducting salt, e.g., potassium nitrite, may be used in amounts up to about 20 g./l. Sufficient ammonia or ammonium hydroxide is used to adjust the pH to the desired range of between about 8.0 and 12.0. The plating bath is preferably held at temperatures between about 120 to 180° F. with optimum plating obtained at about 140° F. The optimum pH is 10 to 11.

The following examples further illustrate the plating baths and processes to those skilled in the art.

EXAMPLE 11

An electroplating bath for gold-silver alloy plating was made as follows:

Gold as Ag($NH_2CH_2CH_2NH_2$)(Au(CN)$_2$)—10 dwt./gal.
Dipotassium phosphate—576 g./gal.
Ammonium hydroxide to pH 10.5.

This bath was used to plate over copper at 2.5 amperes per square foot (a.s.f.), 2.2 volts at room temperature to give a bright greenish-gold deposit. The current efficiency was 80 percent.

EXAMPLE 12

An electroplating bath for plating gold-copper alloy was made as follows:

Gold as Cu($NH_2CH_2CH_2NH_2$)$_2$(Au(CN)$_2$)$_2$—10 dwt./gal.
Dipotassium phosphate—576 g./gal.
Ammonium hydroxide to pH 10.5.

This bath was used to plate over copper in the range 0.2 to 42 a.s.f. (optimum 5–15) at room temperature. The deposits obtained were bright pink-gold.

EXAMPLE 13

An electroplating bath for plating gold-palladium alloys was made as follows:

Gold as Pd($NH_2CH_2CH_2NH_2$)$_2$(Au(CN)$_2$)$_2$—10 dwt./gal.
Ethylenediamine—75 ml./gal.
Dipotassium phosphate—215 g./gal.
Ammonium hydroxide to pH 10.5.

This bath was used to plate over copper in the range 5 to 15 a.s.f. Current efficiency ranged from 41 to 66 percent. The plates were bright, white gold.

EXAMPLE 14

An electroplating bath for gold-zinc alloy plating was made as follows:

Gold as Zn($NH_2CH_2CH_2NH_2$)$_2$(Au(CN)$_2$)$_2$—10 dwt./gal.
Dipotassium phosphate—576 g./gal.
Ammonium hydroxide to pH 10.5.

This bath was used to plate over copper at 2.5 a.s.f., room temperature. The plate was a bright green-gold. Current efficiency was 48 percent.

EXAMPLE 15

An electroless (chemical) plating bath was prepared as follows:

Gold as Pd($NH_2CH_2CH_2NH_2$)$_2$(Au(CN)$_2$)$_2$—10 dwt./gal.
Disodium salt of ethylenediamine-tetraacetic acid—140 g./gal.
Dipotassium phosphate—30 g./gal.
Potassium nitrite—2 g./gal.
Ammonia to pH 10.5.

This bath was used to plate electrolessly over copper at pH's from 8.2 to 10.6 (optimum 10.5) and temperatures from 120 to 180° F. (optimum 140° F.). Thickness of 30 millionths of an inch of bright gold is obtained in one half hour under optimum conditons. In a total of two hours, 80 to 90 millionths of an inch of bright gold is obtained.

The baths prepared from the corresponding amine salts, such as isopropylenediamine tetraethylenepentamine, aminoethyl ethanolamine, etc., instead of ethylenediamine are also used for plating gold and gold alloy.

The compounds of this invention are also useful as activators for metal such as copper, copper alloys, nickel, tin and silver, before these metals are plated, either electrolytically or chemically, or before they are treated with agents which produce resistance to tarnish or corrosion, or before they are exposed to other processing, such as soldering.

Although the invention has been described in connection with specific embodiments, it is to be understood that it includes all modifications and variations that come within the scope of the appended claims.

What is claimed is:

1. An aqueous solution for electroplating gold and gold alloys containing between about 5 and 30 dinar weight per gallon, calculated as metallic gold, of a compound of the formula M(E)$_m$(Au(CN)$_2$)$_n$, wherein M represents a metallic element selected from the Group IB, IIB, IIIA, IVA, or VIII of the Periodic Table; $n$ is a numeral equal to the most common positive valence of the metal M in aqueous solution, $m$ is an integer from $n-1$ to $n+1$; and E is an amine selected from those having the formulae

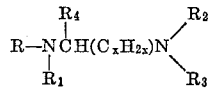

and

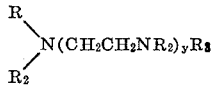

wherein $x$ is 1–3, $y$ is 1–4, R, $R_1$, $R_2$, and $R_3$ are each selected from the group consisting of hydrogen, hydroxymethyl, and hydroxyethyl, $R_4$ is selected from the group consisting of hydrogen, and straight chain alkyls having 1–4 carbon atoms, and at least two of said groups identified as R, $R_1$, $R_2$, $R_3$, and $R_4$ are hydrogen, between 200 and 600 grams per gallon of dipotassium phosphate; and sufficient ammonium hydroxide to adjust the pH to between 8.0 and 12.0.

2. A solution in accordance with claim 1 containing up to 200 milliliters per gallon of ethylenediamine.

3. A solution in accordance with claim 2 containing as the source of metallic gold

4. A solution in accordance with claim 1 containing as the source of metallic gold

5. A solution in accordance with claim 1 containing as the source of metallic gold

6. A solution in accordance with claim 1 containing as the source of metallic gold

7. A solution in accordance with claim 1 containing as the source of metallic gold $$Zn(NH_2CH_2CH_2NH_2)_3(Au(CN)_2)_2$$

8. An aqueous solution for electroless plating of gold and gold alloys comprising between about 5 and 20 dinar weight per gallon, calculated as metallic gold, of a compound of the formula $M(E)_m(Au(CN)_2)_n$, wherein M represents a metallic element selected from the Group I–B, II–B, IIIA, IVA, or VIII of the Periodic Table; $n$ is a numeral equal to the most common positive valance of the metal M in aqueous solution, $m$ is an integer from $n-1$ to $n+1$; and E is an amine selected from those having the formulae

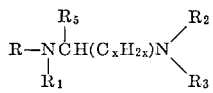

and

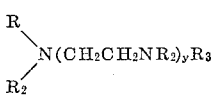

wherein $x$ is 1–3, $y$ is 1–4, R, $R_1$, $R_2$, and $R_3$ are each selected from the group consisting of hydrogen, hydroxymethyl, and hydroxyethyl, $R_4$ is selected from the group consisting of hydrogen and straight chain alkyls having 1–4 carbon atoms, and at least two of said groups identified as R, $R_1$, $R_2$, $R_3$, and $R_4$ are hydrogen; between about 10 and 60 grams per gallon of dipotassium phosphate; between about 50 and 200 grams per gallon of a complexing agent selected from the group consisting of nitrilotriacetic acid, ethylenediamine tetraacetic acid, hydroxy-ethyl-ethylenediamine triacetic acid, ethylenediamine diacetic acid, cycloehxanediamine tetraacetic acid, diethylene triamine pentaacetic acid, imino diacetate and salts of said acids; up to 20 grams per liter of potassium nitrite; and sufficient ammonium hydroxide to adjust the pH to between 8.0 and 12.0.

9. A solution in accordance with claim 8 containing up to 200 milliliters per gallon of ethylenediamine.

10. A solution in accordance with claim 9 containing as the source of metallic gold $$Pd(NH_2CH_2CH_2NH_2)_2(Au(CN_2)_2$$

References Cited

UNITED STATES PATENTS

| | | | |
|---|---|---|---|
| 2,660,554 | 11/1953 | Ostrow | 204—43 |
| 2,967,135 | 1/1961 | Ostrow et al. | 204—43 |
| 3,092,559 | 6/1963 | Foulke et al. | 204—43 |

FOREIGN PATENTS 960,314   6/1964   Great Britain.

GERALD L. KAPLAN, Primary Examiner

U.S. Cl. X.R.

106—1; 117—130; 204—43, 46